United States Patent
Fowe et al.

(10) Patent No.: US 9,336,448 B2
(45) Date of Patent: May 10, 2016

(54) VARIABLE SPEED SIGN VALUE PREDICTION AND CONFIDENCE MODELING

(71) Applicant: HERE Global B.V., Veldhoven (NL)

(72) Inventors: James Adeyemi Fowe, Evanston, IL (US); Leon Oliver Stenneth, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 86 days.

(21) Appl. No.: 14/456,081

(22) Filed: Aug. 11, 2014

(65) Prior Publication Data

US 2016/0042239 A1 Feb. 11, 2016

(51) Int. Cl.
- *G06K 9/00* (2006.01)
- *G06T 7/20* (2006.01)
- *G06K 9/62* (2006.01)

(52) U.S. Cl.
CPC .......... *G06K 9/00818* (2013.01); *G06K 9/6201* (2013.01); *G06T 7/20* (2013.01)

(58) Field of Classification Search
None
See application file for complete search history.

(56) References Cited

U.S. PATENT DOCUMENTS

| | | | |
|---|---|---|---|
| 7,433,889 B1 | 10/2008 | Barton | |
| 7,439,853 B2* | 10/2008 | Tengler | G08G 1/052 340/466 |
| 8,255,144 B2* | 8/2012 | Breed | B60N 2/2863 340/436 |
| 8,494,759 B2 | 7/2013 | Hada | |
| 2006/0034484 A1 | 2/2006 | Bahlmann et al. | |
| 2007/0198169 A1* | 8/2007 | Nathan | G08G 1/09671 701/117 |
| 2009/0041304 A1* | 2/2009 | Bradai | G08G 1/09626 382/104 |
| 2009/0140887 A1 | 6/2009 | Breed et al. | |
| 2010/0045797 A1* | 2/2010 | Schofield | G06K 9/00818 348/148 |
| 2010/0299055 A1 | 11/2010 | Hilbrandie et al. | |
| 2011/0248867 A1 | 10/2011 | Lee et al. | |
| 2011/0301802 A1 | 12/2011 | Rupp et al. | |
| 2012/0059574 A1* | 3/2012 | Hada | G08G 1/0112 701/119 |
| 2012/0161982 A1* | 6/2012 | Musachio | E01F 9/005 340/932 |
| 2012/0173530 A1 | 7/2012 | Kurciska et al. | |
| 2012/0283942 A1* | 11/2012 | T'Siobbel | G01C 21/26 701/410 |
| 2013/0297211 A1 | 11/2013 | Burr et al. | |

FOREIGN PATENT DOCUMENTS

DE          3128578 A1    2/1983

(Continued)

OTHER PUBLICATIONS

Llorca et al., Vision-Based Traffic Data Collection for Floating Car Data Enhancement, 2010, University of Alcala.

(Continued)

*Primary Examiner* — Utpal Shah
(74) *Attorney, Agent, or Firm* — Lempia Summerfield Katz LLC

(57) ABSTRACT

Systems, methods, and apparatuses are disclosed for predicting the value of a variable speed sign (VSS) and determining the predicted value's associated confidence level. Highly assisted driving (HAD) vehicles may read or capture images of the VSS. The speed limit values, images, or videos of the VSS are reported and received by a network and database for analysis. A predicted speed limit value is determined for the variable speed sign from at least a portion of the received traffic data. A confidence level is also calculated for the predicted speed limit value for the variable speed sign.

22 Claims, 7 Drawing Sheets

(56) References Cited

FOREIGN PATENT DOCUMENTS

| | | |
|---|---|---|
| DE | 102012216788 A1 | 5/2014 |
| EP | 2383679 | 11/2011 |
| WO | WO9611458 | 4/1996 |
| WO | WO9636929 | 11/1996 |
| WO | WO2009035697 | 3/2009 |
| WO | WO2009100058 | 8/2009 |

OTHER PUBLICATIONS

Private Probe Vehicle Data for Real Time Applications, Final Report, Sep. 23, 2011, azmag.gov/Documents/ITS_2011-10-27_Private-Probe-Vehicle-Data-for-RealTime-Applications-Final-Report.pdf.
PCT International Search Report and Written Opinion of the International Searching Authority dated Dec. 16, 2015 for corresponding PCT/IB2015/057567.

* cited by examiner

VARIABLE SPEED SIGN VALUE PREDICTION AND CONFIDENCE MODELING

FIELD

The following disclosure relates to variable speed signs, or more particularly, estimations and algorithms for predicting values and confidence levels for variable speed signs.

BACKGROUND

Variable Speed Signs (VSS) are used to report variable speed limits in certain areas. VSS allow operators to adjust (e.g., raise or lower) the posted speed limit without changing a physical sign. The signs may be used in conjunction with Intelligent Transportation Systems to adjust speed limits for several reasons including: congestion, construction, accidents, or weather conditions. As technology advances, the ease of use of VSS is also increasing. Reported speed limits may now be changed on the VSS remotely via email or telephone, at pre-set times of day, or manually. VSS also may be used to alter speed limits based on real time traffic, weather conditions, or construction.

For example, weather-related VSS may be used on roads where fog, ice, rain, snow, or other factors may influence safety. When weather conditions deteriorate to the point that hazardous conditions are impending, the operating agency may adjust (e.g., reduce) the speed limit to help minimize the likelihood of a traffic accident. Congestion-related VSS may be used when traffic volumes are building and congestion is likely. When volumes and/or speed exceed a predetermined threshold, an operational strategy may be deployed to handle more traffic volume at a reduced, but not stop-and-go, speed.

In the case of construction-related VSS, a long construction zone may often have actual construction occurring in only short segments of the zone. In addition, construction zones may be signed using static speed limit signs as if construction activity occurs throughout the entire day on each and every day. In reality, the intensity, duration, and location of construction activity may vary throughout the construction zone depending on the extent of work being performed. Providing more accurate and real time speed restrictions using VSS based on the level of construction activity may provide more accurate information to motorists and allow drivers to comply with the posted regulatory speed while improving safety in the construction zone. Adjusting (e.g., reducing) vehicle speed limits in active construction zones may improve safety for drivers and construction workers and may reduce the number and/or severity of accidents that occur in the zone.

Today's vehicles may have high definition cameras and advance radar systems that read the displayed value on a VSS from a long distance away. There are several shortcomings with relying on visual detection such as camera for VSS display value detection. For example, a vehicle's camera may confuse 50 km/h with 80 km/h. In some instances, the vehicle operator may be incorrectly warned, which may impede on the operator's safety.

Because municipalities (e.g., traffic management centers) that control the VSS may be unwilling to communicate the real time speed limits displayed on the VSS to third parties, there remains a continuing effort to provide improved systems and methods for reading a VSS with a highly assisting vehicle, predicting the posted speed limit value of the VSS, and calculating the confidence level of the predicted value.

SUMMARY

Systems, methods, and apparatuses are provided for predicting a variable speed sign value and its associated confidence level. In one embodiment, the method comprises receiving a set of traffic data from at least one vehicle for a defined time period, the received traffic data comprising captured images, videos, or interpreted speed limit values of a variable speed sign. The method further comprises determining, using a processor, a predicted speed limit value for the variable speed sign from at least a portion of the received traffic data. The method further comprises calculating a confidence level for the predicted speed limit value for the variable speed sign.

In one embodiment, the apparatus comprises at least one processor and at least one memory including computer program code for one or more programs; the at least one memory and the computer program code configured to, with the at least one processor, cause the apparatus to at least perform: (1) receive a set of traffic data from at least one vehicle for a defined time period, the received traffic data comprising captured images, videos, or interpreted speed limit values of a variable speed sign; (2) determine a predicted speed limit value for the variable speed sign from at least a portion of the received traffic data; and (3) calculate a confidence level for the predicted speed limit value for the variable speed sign.

BRIEF DESCRIPTION OF THE DRAWINGS

Exemplary embodiments are described herein with reference to the following drawings.

DETAILED DESCRIPTION

The following embodiments include systems, methods, and apparatuses for predicting the value of a variable speed sign (VSS) and determining the predicted value's associated confidence level. In certain embodiments, using an attached camera, a highly assisted driving (HAD) vehicle reads or captures a VSS, and determines the speed limit value displayed on the VSS. The determined value or captured image is reported to a network and database for analysis. In combination with other reported data, a speed limit value and confidence level is determined. The value and confidence level may be reported back to the vehicle. Based on the predicted value and confidence level, the vehicle's navigation system may (1) alert the driver of any difference in operating speed from the predicted variable speed limit, or (2) adjust the speed of the vehicle to approximate the predicted variable speed limit. The scope of this system, method, and/or apparatus is described in further detail herein.

As used herein, the terms "actual speed limit value" and "actual speed sign value" may refer to the actual posted speed sign value on a variable speed sign. The actual value is attempted to be read and verified by the systems, methods, and apparatuses described herein.

As used herein, the terms "interpreted speed limit values" and "interpreted speed sign values" may refer to the speed sign values read and interpreted by the plurality of vehicles, and reported to the network or cloud for further processing. For example, camera or sensors on the plurality of vehicles may observe a VSS on the roadway, capture the images displayed on the VSS, interpret the images, and report the interpreted values.

As used herein, the terms "analyzed speed limit values" and "analyzed speed sign values" may refer to the speed sign values determined by an external processor from the plurality of vehicles. For example, the plurality of vehicles may capture images or videos of the VSS, and report those captured images or videos to a processor for further analysis. The processor may then analyze the images or videos and determine an analyzed speed sign value for each image or video.

As used herein, the terms "predicted speed limit value" and "predicted speed sign value" may refer to the speed sign value determined from the compilation of interpreted and/or analyzed speed sign values from the plurality of vehicles.

Variable Speed Signs (VSS)

A variable speed sign may be used on a roadway to give travelers information about the road ahead. Speed limit values may be displayed on electronic signs positioned next to the road, over a portion of the traffic lanes, or overhead each traffic lane. In certain embodiments, the electronic signs may be displayed on a gantry extending over a portion of the roadway.

Figure 1:
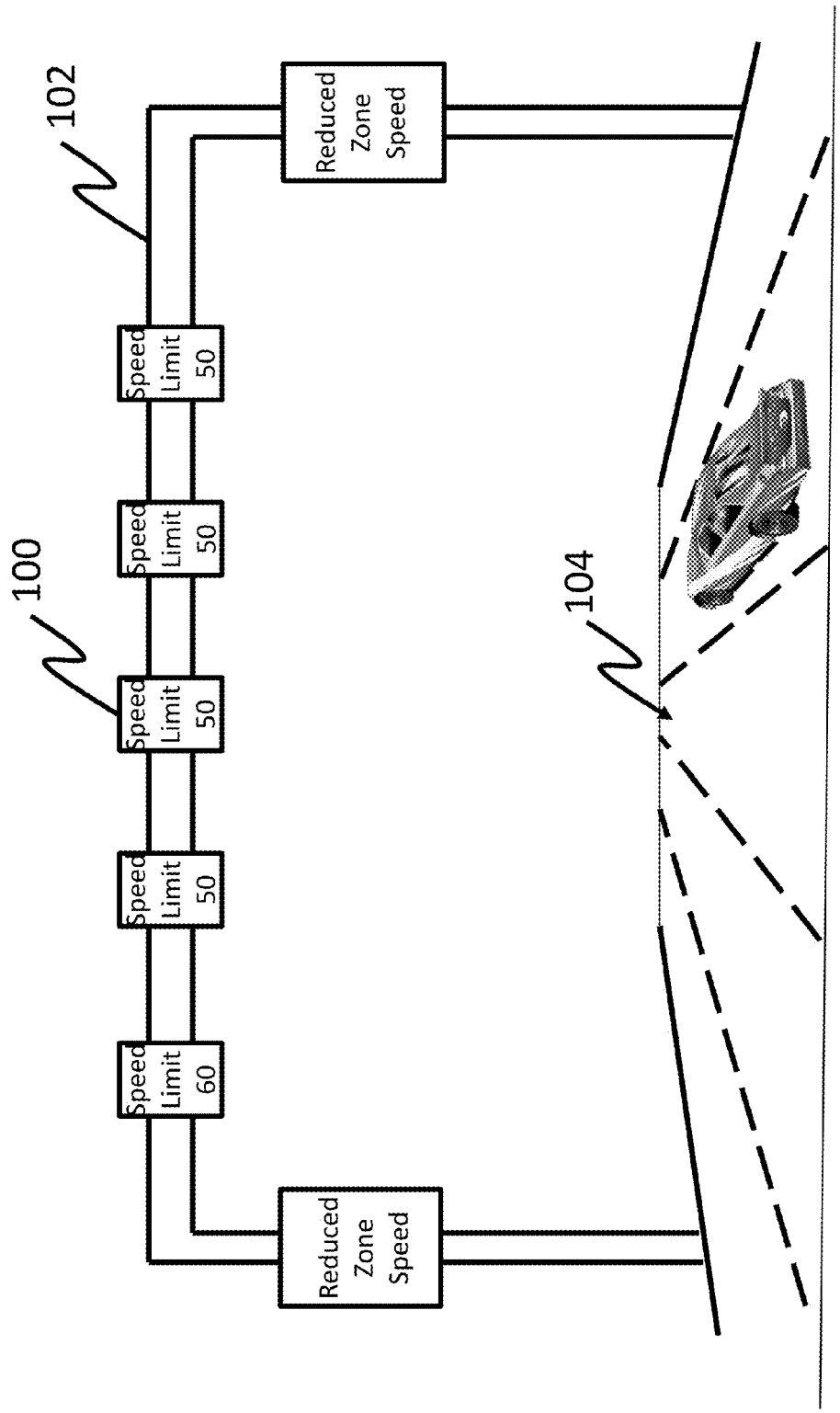
FIG. 1 illustrates an example gantry displaying a plurality of variable speed signs.

FIG. 1 illustrates an embodiment of a VSS display, wherein a number of electronic signs 100 are connected to a gantry 102 and displayed over traffic lanes 104 of a roadway. As depicted in FIG. 1, an electronic sign is positioned over each traffic lane.

In other embodiments, a single electronic sign may be positioned over one of the traffic lanes, or on the side of the road next to the traffic lanes. In yet other embodiments, a plurality of electronic signs less than the total number of traffic lanes may be positioned over or next to a portion of the traffic lanes of the roadway.

In certain embodiments, the electronic sign(s) may include variable speed limit values. The signs may also include additional text such as "CAR" or "TRUCK," to provide additional information regarding which vehicles the displayed speed limit value pertains (e.g., the variable speed limit value for a car could be 60 while the speed limit value for a truck could be 50).

Capturing VSS Data with Autonomous and Highly Assisted Driving (HAD) Vehicles

Variable speed signs may be read by a driver operating a vehicle traveling along the roadway, or may be read by a sensor (e.g., camera or radar system) attached to a vehicle traveling along the roadway. In some embodiments, the vehicle may be an "autonomous vehicle" or a "highly assisted driving (HAD) vehicle."

As described herein, an autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

As described herein, a highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

The autonomous or highly automated driving vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

Figure 2:
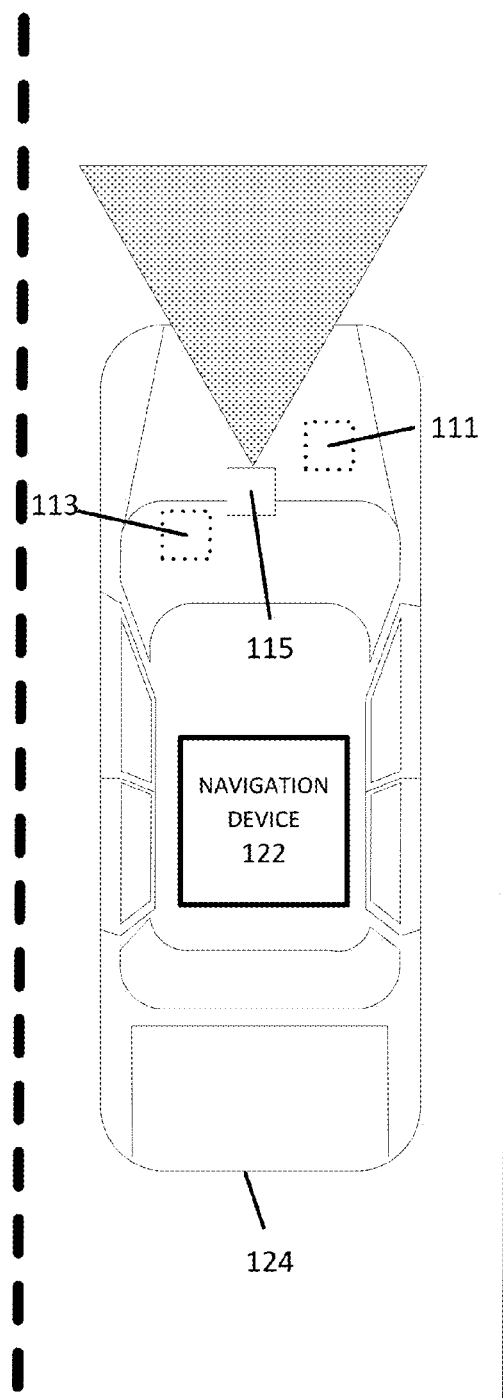
FIG. 2 illustrates an example vehicle with camera or image sensors for reading variable speed signs.

FIG. 2 illustrates example sensors for a vehicle 124. For example, an engine sensor 111 may include throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. A vehicle sensor 113 may include a steering wheel angle sensor, a speedometer sensor, or a tachometer sensor.

An additional vehicle sensor 115 may be a camera, a light detection and ranging (LIDAR) sensor, a radar sensor, or an ultrasonic sensor. The vehicle sensor 115 may determine road status such as the shape or turns of the road, the existence of speed bumps, the existence of pot holes, the wetness of the road, or the existence or ice, snow, or slush.

In certain embodiments, the vehicle sensor 115 may be programmed to identify a VSS and read or capture the displayed speed limit value. In some embodiments, the sensor 115 may be programmed to read or capture the displayed speed limit value of a VSS positioned on an overhead gantry above the same traffic lane as the vehicle. In other embodiments, the sensor 115 may be programmed to read or capture the displayed speed limit value of a VSS positioned on a gantry above a separate traffic lane or along the side of the road if no VSS is positioned above each traffic lane. In yet other embodiments, the sensor 115 may be programmed to read or capture additional text on the VSS such as "CAR" or "TRUCK." To the extent the vehicle 124 is a car, the sensor 115 may be programmed to further process a speed limit value associated with a VSS labeled "CAR." To the extent the vehicle 124 is a truck, the sensor 115 may be programmed to further process a speed limit value associated with a VSS labeled "TRUCK."

Reporting Data to the Network

In certain embodiments, after a VSS has been read by a sensor (e.g., camera or radar system), the vehicle may report its captured image or video data of the VSS to a network. In other embodiments, a vehicle system may analyze the VSS image, determine a speed limit value, and report the interpreted speed limit value to a network. In the transfer of data, the vehicle may also report vehicle identification, time stamp, and location data. Upon receipt of the data by the network, the network may relay the data to a processor or controller for compilation and analysis with additional data. In certain embodiments, the location of the vehicle is known based upon the time of the reporting and a known location of a VSS.

The vehicle may be in communication with a navigation device within or attached to the vehicle. The navigation device may communicate with a network, wherein the data collected from the sensors (e.g., speed limit values) may be transmitted through the network and stored in a database or at the server. Additionally, through the navigation device, the vehicle may submit and download data from the automotive cloud network. Data from other vehicles stored in the automotive cloud may be used to modify the vehicle confidence level or define the confidence threshold.

The vehicle sensors may include global positioning system (GPS) or the navigation device may include one or more detectors or sensors as a positioning system built or embedded into or within the interior of the navigation device. The navigation device may receive location data for geographic position from the positioning system.

Predicting Variable Speed Value and Confidence Level in Real-Time

In certain embodiments, the network or cloud system may collect transmitted VSS data from a plurality of vehicles. In other embodiments, the network may collect a plurality of transmitted VSS data from a single vehicle. In some embodiments, the network may collect a plurality of VSS data from a plurality of vehicles. VSS data may be separately compiled and analyzed for each separate speed sign being analyzed. In some embodiments, after receipt of the captured image or video data from the vehicle, the data may need to be analyzed to determine the speed sign value within the data image or video to provide an analyzed speed sign value. In other embodiments, the VSS data reported from the vehicle has already determined and reported an interpreted speed sign value.

Based on a compilation of a plurality of interpreted speed sign values or analyzed speed sign values for a specific VSS, a speed limit value may be predicted with a calculated confidence level. The confidence level of the predicted speed limit value may be a function of the number of samples reported and/or analyzed, the time of the samples, and the variation in the speed limit values of the reported samples. Since the posted, actual speed limit value on a VSS may be adjusted at any time, a vehicle's reported data may become less reliable the further the data is from real time (i.e., the confidence of the predicted speed sign value may decay with time). Therefore, in some embodiments, only data within a defined time window or a defined number of epochs may be used in the determination of the VSS value. For example, an epoch or number of epochs may be limited to 15 minutes, 30 minutes, 1 hour, etc. The defined epoch may be variable based on the time of day, day of the week, or day of the year (e.g., a larger epoch may be acceptable during off-peak, less variable travel conditions where the speed limit value on the VSS may not be adjusted as frequently).

In certain embodiments, an algorithm is executed to predict the speed limit value and confidence level of a VSS. In some embodiments, the speed limit value is predicted based on a statistical calculation or correlation of the data set of interpreted or analyzed speed sign values. For example, the mode, mean, or median of the data set may be determined.

In one embodiment, the median count algorithm is executed to predict the speed limit value and confidence level of a VSS. In other words, the algorithm determines the middle value of the data set. Therefore, if the data set includes an even number of values, the determined speed limit value may be (1) randomly selected between the two middle values or (2) calculated as the average of the two middle values.

In one embodiment, a modal count algorithm is executed to predict the speed limit value and confidence level of a VSS. In other words, the predicted speed limit value may be based on the mode (or number repeated more often than any other number) in the plurality of reported VSS data messages. In certain embodiments, when calculating the mode of the data set, to the extent the data set is bimodal or multimodal where more than one value appears the most often in the data set, a single mode may be selected randomly between the most frequent options.

In one embodiment, a number n of VSS messages are reported to the network for processing for a particular VSS within a single epoch (defined from t−1 to t). $V_t$ is defined as a real-time update for the VSS at time t, wherein $V_t = \{VSS_1, VSS_2, \ldots, VSS_n\}$ for n messages within the epoch, with $VSS_i$=the ith vehicle's report.

In certain embodiments, the speed limit data may be aggregated for a VSS over a particular time period x. The real-time speed limit aggregation set may be defined as $S_t$, and contain all $V_t$ over the time period x (e.g., $S_t = \{V_t \cup V_{t-1} \cup V_{t-2} \cup \ldots \cup V_{t-x}\}$).

A first modal value set $M_1(S_t)$ may be defined to include all elements of the mode value in set $(S_t)$. A second order modal value set $M_2(S_t)$ may be defined to include all elements of the mode value in set $(S_t - M_1(S_t))$. In other words, the first modal value $M_1(S_t)$ is removed when computing $M_2(S_t)$.

In certain embodiments, for the current set of data, a confidence level may be calculated for the predicted speed sign value. In certain embodiments, for the current aggregate set $S_t$, the estimated VSS value at time t ($EVSS_t$) with confidence level $C_t$ may be calculated as:

$$EVSS_t = \langle \text{Mode}(S_t), C_t \rangle \qquad (1)$$

$$C_t = 100\left(1 - \frac{|M_s(S_t)|}{|M_1(S_t)|}\right) \qquad (2)$$

wherein $|M_1(S_t)|$=total number of elements in the set $M_1(S_t)$ and $|M_2(S_t)|$=total number of elements in set $M_2(S_t)$.

In other embodiments, the confidence level may be influenced by a user's confidence threshold. The confidence level $C_t$ may be calculated as:

$$C_t = 100\left(1 - \frac{|M_2(S_t)|}{|M_1(S_t)|}\right) e^{\left(\frac{-1}{\beta |M_1(S_t)|}\right)} \qquad (3)$$

wherein $\beta$ is a calibration constant that is the measure of user's confidence threshold. In one embodiment, the calibration constant is 2 (i.e., $\beta=2$).

In some embodiments, the confidence level may be a factor of the number of traffic data points or observations reported to the database. For example, a larger number of observations may correlate with a higher calculated confidence level. Likewise, a lower number of observations may correlate with a lower calculated confidence level. As shown in equation (3), the confidence level increases as $|M_1(S_t)|$ increases, and decreases as $|M_1(S_t)|$ decreases. For example, if there is only one element in $S_t$, the confidence level as calculated in equation (2) would give confidence of 100 while (3) would give confidence of 60 when $\beta=2$.

In certain embodiments, the calculated confidence level may be a factor of the similarity or dissimilarity of the determined or analyzed speed limit values. For instance, if ten speed sign values are reported, and nine out of ten report the same value, the confidence level will be higher than if only five out of ten report the same value.

In other embodiments, the calculated confidence level may be a factor of a previously calculated confidence level. For example, to the extent additional vehicle data is reported for the VSS within a defined time period or epoch, the estimated speed limit value and confidence level may be recalculated or refreshed in real-time to include the new data. A fresh, real-time update may occur at time t+1, wherein $V_{t+1}$ is defined as a real-time update for the VSS at time t+1. As discussed above, the speed limit data may be aggregated for a VSS over a particular time period. In this embodiment, the refreshed, updated real-time speed limit aggregation set may be defined as $S_{t+1}$:

$$S_{t+1} = V_{t+1} + S_t - V_{t-w(+)} \quad (4)$$

where w=the sliding window value, and w(+) is defined as inclusive of every other element greater than w.

Therefore, for the current aggregate set $S_{t+1}$, the estimated VSS speed at time t+1 (EVSS$_t$) with confidence level $C_t$ may be calculated as:

$$EVSS_{t+1} = \langle \text{Mode}(S_{t+1}), C_{t+1} \rangle \quad (5)$$

$$C_{t+1} = 100\left(1 - \frac{|M_2(S_{t+1})|}{|M_1(S_{t+1})|}\right) \quad (6)$$

In yet other embodiments, the calculated confidence level may be a factor of time each traffic point within the set of traffic data is collected. For example, the calculated confidence level may decrease with an increase in time between the time of each received traffic point and a present time. In certain embodiments, to the extent no new additional vehicle data is reported for the VSS within a defined time period or epoch, the confidence level may be adjusted to represent the lack of up-to-date, current information (i.e., the confidence level may be lowered to account for the lack of current data). In this embodiment, the real-time speed limit aggregation set may be defined as $S_{t+1}$ which is the same as the previous data set $S_t$:

$$S_{t+1} = S_t \quad (7)$$

$$C_{t+1} = C_t e^{-\left(\frac{(t+1)-t}{\alpha}\right)} \quad (8)$$

wherein $\alpha$ is a calibration constant that determines the exponential decay-rate of the confidence level.

In general, $$C_{t+x} = C_t e^{-\left(\frac{x}{\alpha}\right)} \quad (9)$$

wherein x is the number of time units or epochs since the last update.

Figure 3:
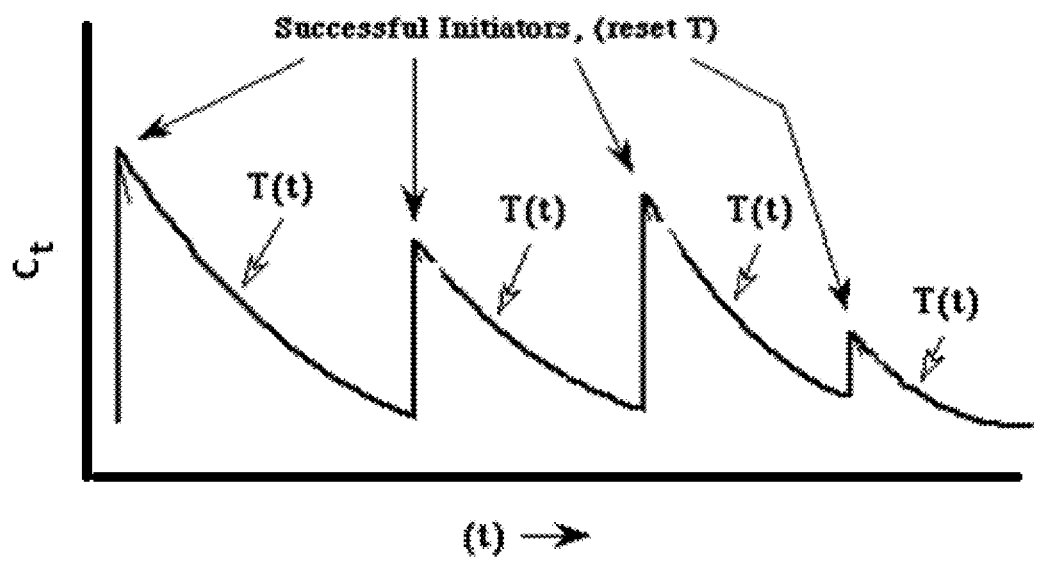
FIG. 3 illustrates an example of confidence decay as a function of time for variable speed sign prediction.

FIG. 3 depicts one embodiment of VSS confidence decay. As depicted, the y axis is a measure of the estimation's confidence level while the x axis is time. In this example, the confidence level increases when VSS data is successfully reported over a particular time period. The confidence level increases further with more successful reports of VSS data. The confidence level decays over time when there is a lack of VSS data reported over time.

In some embodiments, a slower confidence increase may be implemented when fresh real-time updates are received to take care of the errors in the VSS readings of a single vehicle such that confidence only increases a little and then confidence continues to increase as more fresh-real-time updates with similar VSS speed-limit reports are sent into the system. The optimal tuning between the sharp confidence response approaches in FIG. 3 compared with slower confidence responses described herein would be based on the OEM's image recognition accuracy. For lower accuracy, a slower response approach may be used, whereas for almost perfect accuracy, a faster response approach, as shown in FIG. 3, may be used.

In one particular example, speed sign data is collected for a particular VSS over a period of time (5 epochs). The estimated or predicted speed limit value is determined and a confidence level was calculated using equation (2). A sliding window is used to account for figuring the confidence level over several time frames/epochs (w=4). An exponential decay rate calibration constant is also used ($\alpha$=7.6). Table 1 below shows the results based on the collected speed sign data for the VSS.

TABLE 1

| Epoch (t) | New Data ($V_t$) | Overall Data ($S_t$) | EVSS$_t$ | C$_t$ |
|---|---|---|---|---|
| 0 | 70; 70; 70 | 70; 70; 70 | 70 | 100 |
| 1 | 70; 120; 70; 65 | 70; 120; 70; 65; 70; 70; 70 | 70 | 80 |
| 2 | — | 70; 120; 70; 65; 70; 70; 70 | 70 | 70.14 |
| 3 | — | 70; 120; 70; 65; 70; 70; 70 | 70 | 61.5 |
| 4 | 80; 120; 80; 80; 80; 120; 80 | 80; 120; 80; 80; 80; 120; 80; 70; 120; 70; 65 | 80 | 40 |
| 5 | 80; 80; 80; 80; 80; 80; 80; 80; 40 | 80; 80; 80; 80; 80; 80; 80; 80; 40; 80; 120; 80; 80; 80; 120; 80 | 80 | 85 |

As shown in Table 1, after one time interval and one data set, the confidence level is at 100. The level noticeably drops after epochs 2 and 3 return no new data. The confidence value accordingly decays over these time intervals. Upon an influx of new data in epoch 4, old data from epoch 0 is no longer included. Additionally, it appears as if the variable speed sign has changed from 70 to 80. The confidence level is accordingly lower due to the larger uncertainty of the correct speed limit value. Upon the reporting of additional data in epoch 5, data from epoch 1 is removed, and the confidence level increases as it is more certain that the speed limit value is 80.

Reporting Predicted Value and Confidence Level to Vehicle (and Altering/Adjusting)

In certain embodiments, following the calculation of the predicted speed limit value and confidence level for the VSS, the predicted speed limit value and confidence level may be reported to the vehicle. In some embodiments, the determined speed limit value is only reported if the confidence level is above a defined threshold value. In other embodiments, the predicted speed limit value is reported to the vehicle regardless of the confidence level. In some embodiments, the vehicle may process the reported data and make a decision on whether to alert the operator or take action based on the confidence level.

In certain embodiments, the navigation device 122 or another computer system in communication with the navigation device 122 may include instructions for routing the vehicle or generate driving commands for steering the vehicle, shifting gears, increasing and decreasing the throttle, and braking based on the reported data.

For example, if the predicted speed limit value for the VSS is 80 km/hr with a confidence level of 80, and the vehicle is traveling at 100 km/hr, an alert may be provided to the operator of the vehicle to slow down. In an autonomous vehicle, the vehicle may receive instructions through its navigation system or computer system to decrease the throttle or brake to slow down to 80 km/hr.

Figure 4:
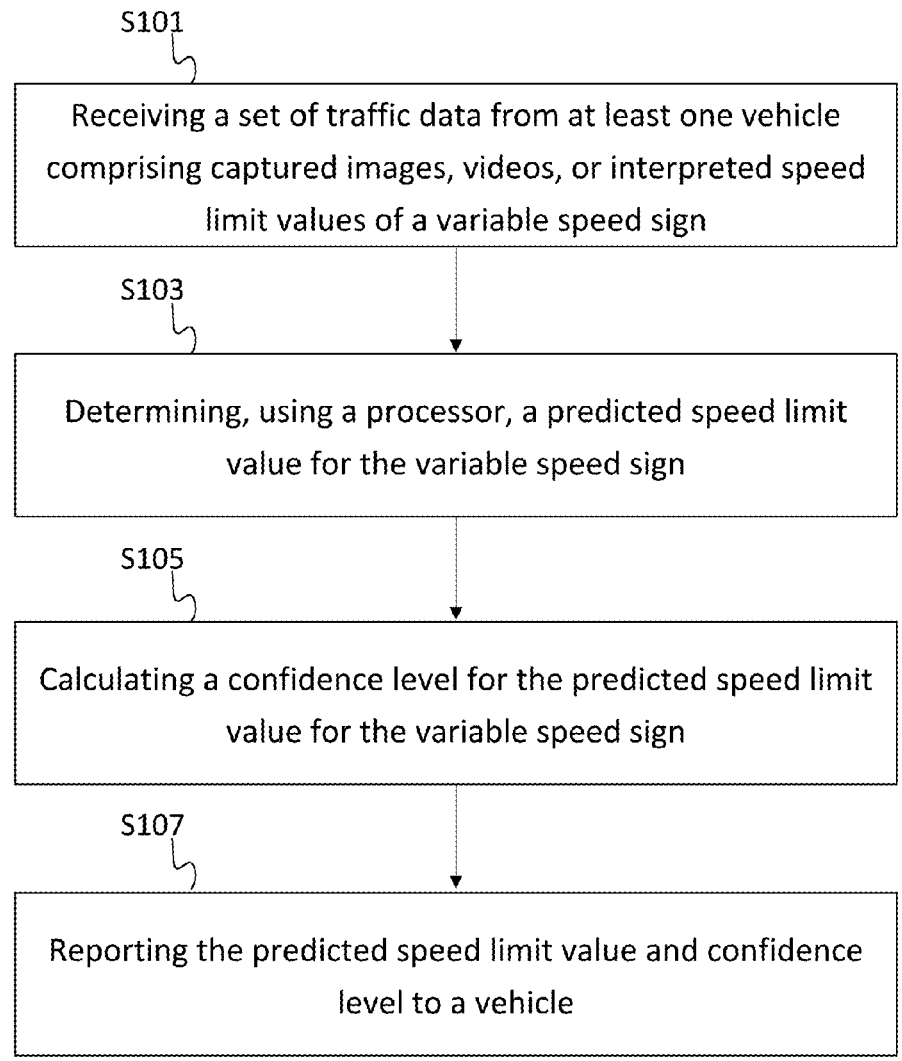
FIG. 4 illustrates an example flowchart for predicting a variable speed sign value and associated confidence level.

FIG. 4 illustrates one embodiment of a flowchart for predicting a speed limit value and a confidence level of the predicted value. The process of the flowchart may be performed by the camera sensor, navigation device, and processor and/or a server and its processor. Alternatively, another device may be configured to perform one or more of the following acts. Additional, fewer, or different acts may be included.

At act S101, a set of traffic data from at least one vehicle is received for analysis. The set of traffic data comprises captured images, videos, or interpreted speed limit values of a variable speed sign. The traffic data may be collected by a highly assisted driving vehicle sensor (e.g., camera).

At act S103, a processor is used to determine a predicted speed limit value for the variable speed sign. In one embodiment, the predicted speed limit value is calculated as the mode value for the set of traffic data. In another embodiment, the predicted speed limit value is calculated as the median value for the set of traffic data. In yet another embodiment, the predicted speed limit value is calculated as the mean value for the set of traffic data.

At act S105, a confidence level for the predicted speed limit value is calculated. The confidence level may be based on the number of samples within the set of traffic data and/or the time the samples were collected.

At act S107, following the determining of the predicted speed limit value and the calculation of the confidence level, the speed limit value and confidence level may be reported to a vehicle. In some embodiments, the reporting only occurs if the confidence level is above or equal to a threshold confidence level.

Navigation and Network System

Figure 5:
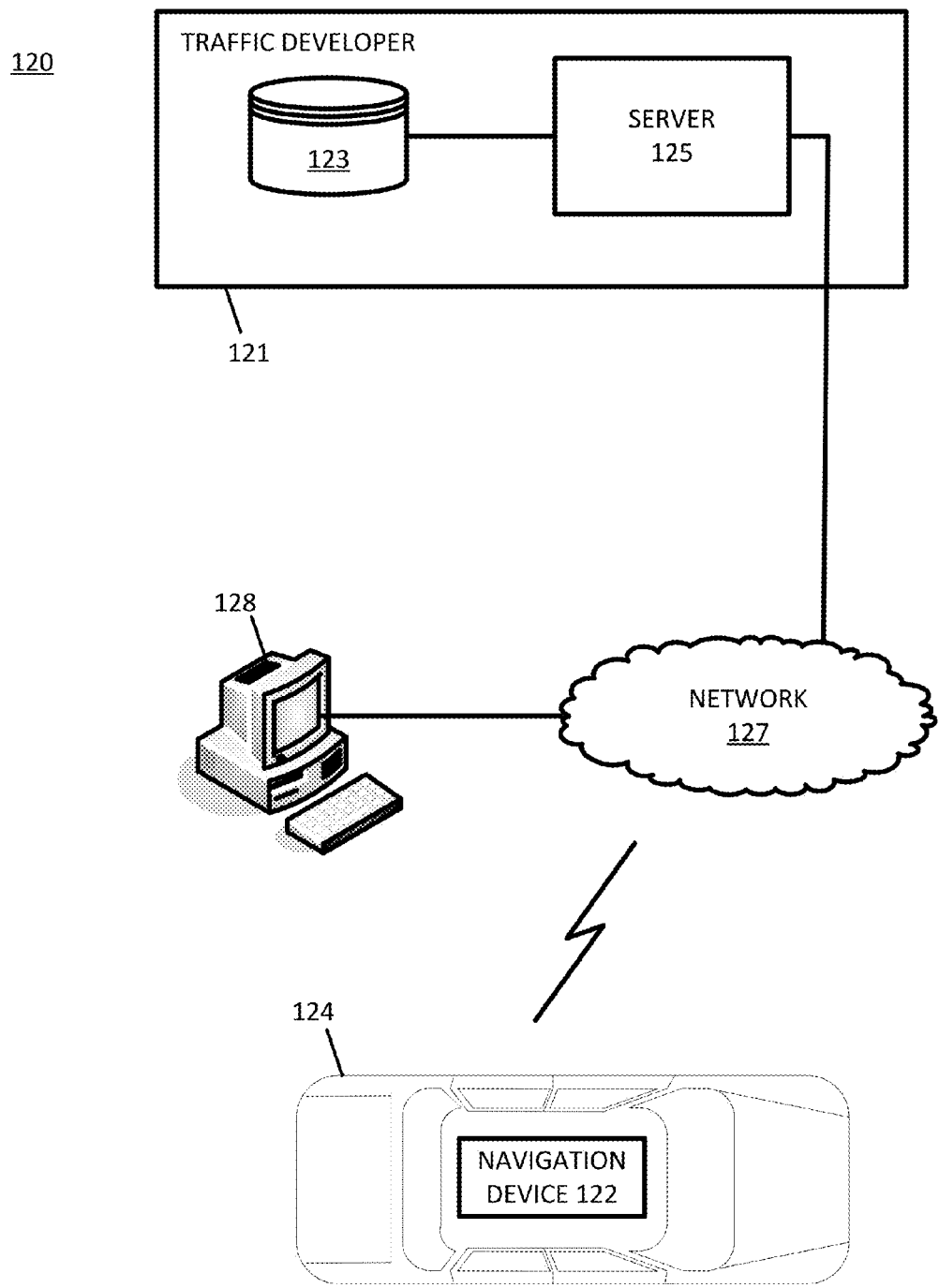
FIG. 5 illustrates an example system for relaying data between a vehicle and a data management system.

FIG. 5 illustrates an example system 120 for reporting and processing speed sign values from a vehicle 124. The system 120 includes a developer system 121, one or more navigation devices 122, a workstation 128, and a network 127. Additional, different, or fewer components may be provided. For example, many navigation devices 122 and/or workstations 128 connect with the network 127. The developer system 121 includes a server 125 and a database 123. The developer system 121 may include computer systems and networks of a system operator.

The navigation device 122 may be carried by or installed within a vehicle 124. The navigation device 122 may be a specialized autonomous driving computer. The navigation device 122 may calculate a vehicle confidence level based on at least one confidence factor. The confidence factors may be based on sensor data collected at the vehicle, environmental data received through the network 127, or responsiveness of the vehicle 124. Alternatively, the navigation device 122 may report sensor data to the server 125, which calculates the vehicle confidence level.

The navigation device 122 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include RDS devices, HD radio devices, mobile phone devices, or car navigation devices such as Garmin or TomTom.

The developer system 121 includes a server 125 and a server database 123. The developer system 121 may include computer systems and networks of a system operator such as HERE, NAVTEQ, or Nokia Corporation. The server database 123 is configured to store the reported VSS data including, but not limited to, the camera image or speed limit value read by the camera and the time stamp and location data associated with the camera image/speed limit value.

The developer system 121, the workstation 128, and the navigation device 122 are coupled with the network 127. The phrase "coupled with" is defined to mean directly connected to or indirectly connected through one or more intermediate components. Such intermediate components may include hardware and/or software-based components.

The workstation 128 may be a general purpose computer including programming specialized for providing input to the server 125. For example, the workstation 128 may provide settings for the server 125. The settings may include a value for the predetermined interval that the server 125 requests the navigation device 122 to relay current geographic locations. The workstation 128 may be used to enter data indicative of GPS accuracy to the database 123. The workstation 128 may include at least a memory, a processor, and a communication interface.

The computing resources may be divided between the server 125 and the navigation device 122. In some embodiments, the server 125 performs a majority of the processing for calculating the vehicle confidence value and the comparison with the confidence threshold. In other embodiments, the computing device 122 or the workstation 128 performs a majority of the processing. In addition, the processing is divided substantially evenly between the server 125 and the computing device 122 or workstation 128.

Figure 6:
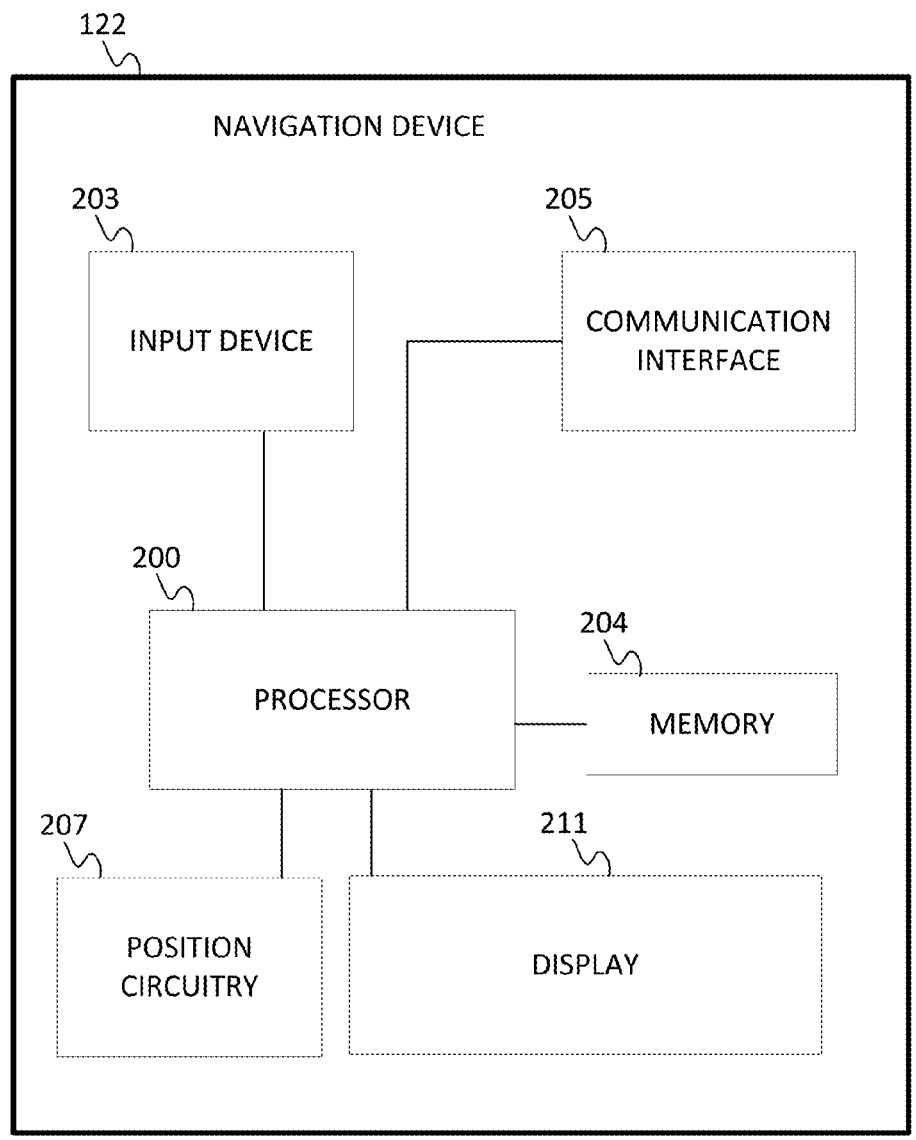
FIG. 6 illustrates an example navigation device of the system of FIG. 5.

FIG. 6 illustrates an exemplary navigation device 122 of the system of FIG. 5. The navigation device 122 includes a processor 200, a memory 204, an input device 203, a communication interface 205, position circuitry 207, and a display 211. Additional, different, or fewer components are possible for the mobile device/personal computer 122.

The processor 200 may be configured to receive data indicative of the location of the navigation device 122 from the position circuitry 207. The positioning circuitry 207, which is an example of a positioning system, is configured to determine a geographic position of the navigation device 122. The positioning system may also include a receiver and correlation chip to obtain a GPS signal. The positioning circuitry may include an identifier of a model of the positioning circuitry 207. The processor 200 may access the identifier and query a database or a website to retrieve the accuracy of the positioning circuitry 207 based on the identifier. The positioning circuitry 207 may include a memory or setting indicative of the accuracy of the positioning circuitry.

Figure 7:
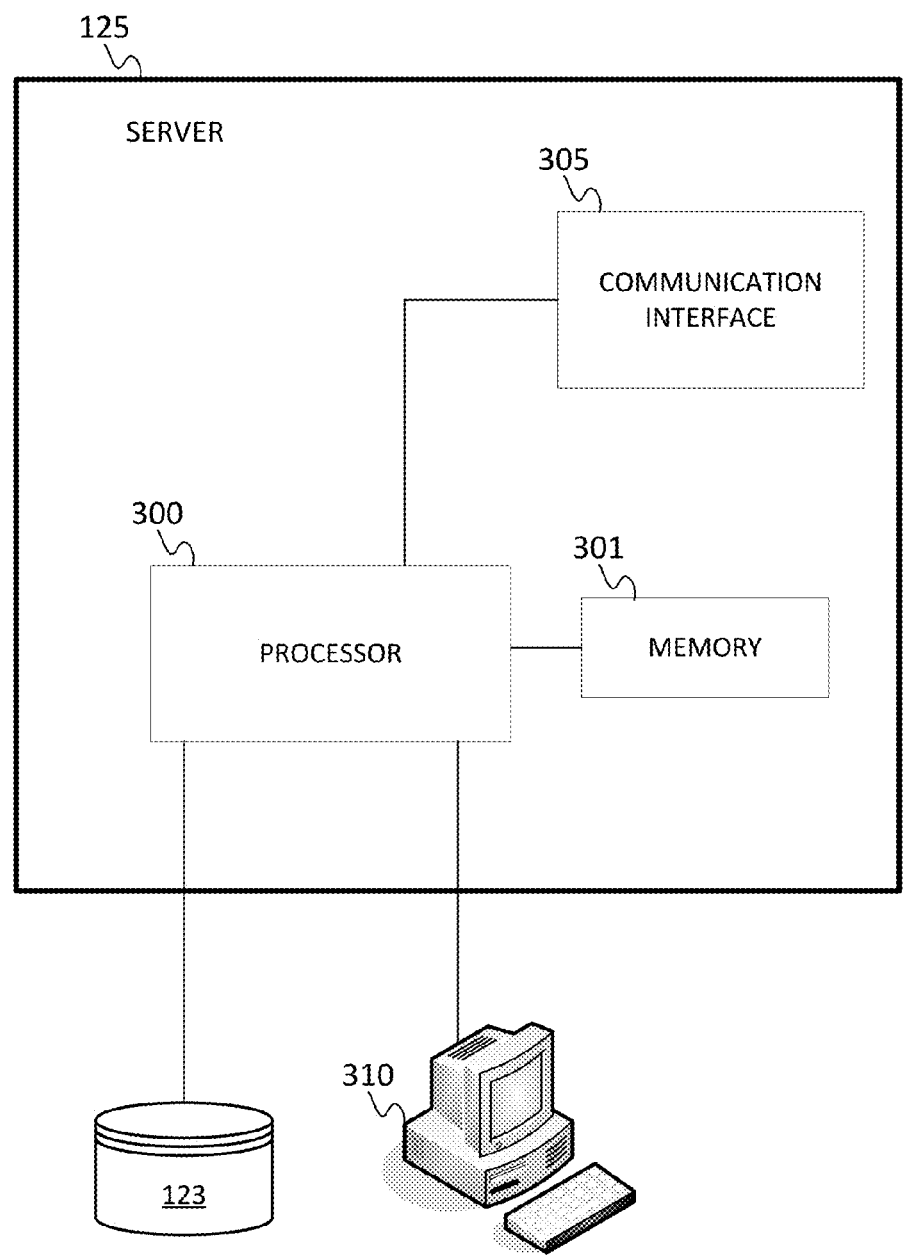
FIG. 7 illustrates an example server of the system of FIG. 5.

FIG. 7 illustrates an exemplary server 125 of the system of FIG. 5. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. In certain embodiments, the communication interface 305 may receive data indicative of use inputs made via the workstation 128 or the navigation device 122.

The navigation device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The navigation device processor 200 and/or the server processor 300 may be a single device or combinations of devices, such as associated with a network, distributed processing, or cloud computing.

The navigation device processor 200 and/or the server processor 300 may also be configured to cause an apparatus to at least perform at least one of methods described above. For example, the navigation device processor 200 may be configured to retrieve and interpret a captured VSS image or video from the vehicle's sensor (e.g., camera) to provide an interpreted speed limit value.

In another embodiment, the server processor 300 may be configured to receive the VSS image or video from the vehicle and analyze the image or video and analyze the speed limit value displayed, therein providing an analyzed speed limit value. The server processor 300 may also be configured to determine a predicted speed limit value for a plurality of VSS data, and calculate the confidence level associated with the predicted speed limit value.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the navigation device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    receiving a set of traffic data from at least one vehicle for a defined time period, the received traffic data comprising captured images, videos, or interpreted speed limit values of a variable speed sign;
    determining, using a processor, a predicted speed limit value for the variable speed sign from at least a portion of the received traffic data; and
    calculating a confidence level for the predicted speed limit value for the variable speed sign.

2. The method of claim 1, wherein the determining comprises computing a mode, a median, or a mean of the portion of the received traffic data.

3. The method of claim 1, further comprising:
    prior to the determining of the predicted speed limit value, analyzing the captured images or the videos of the received traffic data to provide analyzed speed limit values of the variable speed sign.

4. The method of claim 1, further comprising:
    reporting the predicted speed limit value and the calculated confidence level to at least one vehicle.

5. The method of claim 1, further comprising:
    comparing the calculated confidence level with a threshold confidence level; and
    reporting the predicted speed limit value to at least one vehicle when the calculated confidence level is greater than or equal to the threshold confidence level.

6. The method of claim 1, wherein the calculated confidence level is a factor of at least one of the following:
    a) a number of observations in the set of traffic data, wherein a larger number of observations in the set of traffic data increases the confidence level;
    b) a similarity of speed limit values in the observations within the set of traffic data, wherein the confidence level increases with an increase in the similarity of the speed limit values and decreases with a decrease in the similarity of the speed limit values;
    c) a previously computed confidence level; or
    d) a collected time for each received traffic point within the set of traffic data, wherein the calculated confidence level decreases with an increase in a difference in time between the collected time for each received traffic point and a present time.

7. The method of claim 1, wherein the calculated confidence level, $C_t$, is:

$$C_t = 100\left(1 - \frac{|M_2(S_t)|}{|M_1(S_t)|}\right)$$

wherein:
    $|M_1(S_t)|$=total number of elements in set $M_1(S_t)$ of speed limit values, and
    $|M_2(S_t)|$=total number of elements in set $M_2(S_t)$ of speed limit values.

8. The method of claim 1, wherein the calculated confidence level, $C_t$, is:

$$C_t = 100\left(1 - \frac{|M_2(S_t)|}{|M_1(S_t)|}\right)e^{\left(\frac{-1}{\beta|M_1(S_t)|}\right)}$$

wherein:
    $|M_1(S_t)|$=total number of elements in set $M_1(S_t)$ of speed limit values,
    $|M_2(S_t)|$=total number of elements in set $M_2(S_t)$ of speed limit values, and
    $\beta$ is a calibration constant for a user's confidence threshold.

9. The method of claim 1, further comprising:
    updating the set of traffic data with traffic data from vehicles in a second time period;
    determining an updated predicted speed limit value for the variable speed sign using the real-time data and at least a portion of the received traffic data; and
    calculating an updated confidence level for the predicted speed limit value for the variable speed sign.

10. The method of claim 9, wherein the portion of the received traffic data used in determining the updated predicted speed limit is from a collection time associated with each traffic data point of the received set of traffic data.

11. The method of claim 9, wherein when there is no additional traffic data in the second time period, the updated confidence level, $C_{t+1}$, is:

$$C_{t+1} = C_t e^{-\left(\frac{(t+1)-t}{\alpha}\right)}$$

wherein:
    $C_t$=the calculated confidence level at time t, and
    $\alpha$=a calibration constant that defines a confidence level exponential decay-rate.

12. A method comprising:
    receiving a set of traffic data from at least one vehicle in a first time period, the received traffic data comprising captured images, videos, or interpreted speed limit values of a variable speed sign;
    determining, using a processor, a predicted speed limit value for the variable speed sign from a mode of at least a portion of the received traffic data;
    calculating a confidence level for the predicted speed limit value for the variable speed sign;
    comparing the calculated confidence level with a user's confidence level; and
    reporting the predicted speed limit value to a vehicle when the calculated confidence level is greater than or equal to the user's confidence level.

13. An apparatus comprising:
    at least one processor; and
    at least one memory including computer program code for one or more programs; the at least one memory and the computer program code configured to, with the at least one processor, cause the apparatus to at least perform:
receive a set of traffic data from at least one vehicle for a defined time period, the received traffic data comprising captured images, videos, or interpreted speed limit values of a variable speed sign;
determine a predicted speed limit value for the variable speed sign from a portion of the received traffic data; and
calculate a confidence level for the predicted speed limit value for the variable speed sign.

14. The apparatus of claim 13, wherein the predicted speed limit value is determined through a computation of a mode, a median, or a mean of the portion of the received traffic data.

15. The apparatus of claim 13, wherein the at least one memory and the computer program code are configured to cause the apparatus to further perform:
report the predicted speed limit value and the calculated confidence level to a vehicle.

16. The apparatus of claim 13, wherein the at least one memory and the computer program code are configured to cause the apparatus to further perform:
compare the calculated confidence level with a threshold confidence level; and
report the predicted speed limit value to at least one vehicle when the calculated confidence level is greater than or equal to the threshold confidence level.

17. The apparatus of claim 13, wherein the calculated confidence level, $C_t$, is:

$$C_t = 100\left(1 - \frac{|M_2(S_t)|}{|M_1(S_t)|}\right)$$

wherein:
$|M_1(S_t)|$=total number of elements in set $M_1(S_t)$ of speed limit values, and
$|M_2(S_t)|$=total number of elements in set $M_2(S_t)$ of speed limit values.

18. The apparatus of claim 13, wherein the calculated confidence level, $C_t$, is:

$$C_t = 100\left(1 - \frac{|M_2(S_t)|}{|M_1(S_t)|}\right)e^{\left(\frac{-1}{\beta|M_1(S_t)|}\right)}$$

wherein:
$|M_1(S_t)|$=total number of elements in set $M_1(S_t)$ of speed limit values,
$|M_2(S_t)|$=total number of elements in set $M_2(S_t)$ of speed limit values, and
$\beta$ is a calibration constant for a user's confidence threshold.

19. The apparatus of claim 13, wherein the at least one memory and the computer program code are configured to cause the apparatus to further perform:
update the set of traffic data with traffic data from vehicles in a second time period;
determine an updated predicted speed limit value for the variable speed sign using the real-time data and at least a portion of the received traffic data; and
calculate an updated confidence level for the predicted speed limit value for the variable speed sign.

20. The apparatus of claim 19, wherein the portion of the received traffic data used in determining the updated predicted speed limit is from a collection time associated with each traffic data point of the received set of traffic data.

21. The apparatus of claim 19, wherein when there is no additional traffic data in the second time period, the updated confidence level, $C_{t+1}$, is:

$$C_{t+1} = C_t e^{-\left(\frac{(t+1)-t}{\alpha}\right)}$$

wherein:
$C_t$=the calculated confidence level at time t, and
$\alpha$ is a calibration constant that defines a confidence level exponential decay-rate.

22. The apparatus of claim 13, wherein the calculated confidence level is a factor of at least one of the following:
a) a number of observations in the set of traffic data, wherein a larger number of observations in the set of traffic data increases the confidence level;
b) a similarity of speed limit values in the observations within the set of traffic data, wherein the confidence level increases with an increase in the similarity of the speed limit values and decreases with a decrease in the similarity of the speed limit values;
c) a previously computed confidence level; or
d) a collected time for each received traffic point within the set of traffic data, wherein the calculated confidence level decreases with an increase in a difference in time between the collected time for each received traffic point and a present time.

* * * * *